US007111169B2

(12) United States Patent
Ripley et al.

(10) Patent No.: US 7,111,169 B2
(45) Date of Patent: Sep. 19, 2006

(54) METHOD AND APPARATUS FOR CONTENT PROTECTION ACROSS A SOURCE-TO-DESTINATION INTERFACE

(75) Inventors: Michael S. Ripley, Hillsboro, OR (US); Brendan S. Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 09/960,786

(22) Filed: Sep. 22, 2001

(65) Prior Publication Data

US 2002/0141578 A1    Oct. 3, 2002

Related U.S. Application Data

(63) Continuation-in-part of application No. 09/823,423, filed on Mar. 29, 2001.

(51) Int. Cl.
*H04L 9/00* (2006.01)
*H04N 7/167* (2006.01)

(52) U.S. Cl. .................. 713/176; 380/201; 380/44

(58) Field of Classification Search ............... 713/176, 713/161, 167, 189, 200; 380/54, 200–203, 380/44, 217, 239, 241, 262, 277–278; 382/100, 382/116, 119; 705/57–59, 50–51, 56
See application file for complete search history.

(56) References Cited

U.S. PATENT DOCUMENTS

| | | | | |
|---|---|---|---|---|
| 5,809,139 A | * | 9/1998 | Girod et al. ............... 380/202 |
| 5,943,422 A | * | 8/1999 | Van Wie et al. ............. 705/54 |
| 6,301,663 B1 | * | 10/2001 | Kato et al. .................. 713/176 |
| 6,421,450 B1 | * | 7/2002 | Nakano ...................... 382/100 |
| 6,530,021 B1 | * | 3/2003 | Epstein et al. .............. 713/176 |
| 6,557,039 B1 | * | 4/2003 | Leong et al. ............... 709/229 |
| 6,778,757 B1 | * | 8/2004 | Kawamae et al. ............ 386/94 |
| 6,834,346 B1 | * | 12/2004 | Ishibashi et al. ............ 713/179 |

FOREIGN PATENT DOCUMENTS

| | | |
|---|---|---|
| EP | 0 984 346 A | 3/2000 |
| EP | 1 0079 627 A | 2/2001 |
| EP | 1 081 616 A | 3/2001 |
| WO | WO 00 57636 A | 2/2000 |
| WO | WO 02/15579 A1 | 2/2002 |

OTHER PUBLICATIONS

Intel Corporation et al., "Content Protection for Recordable Media specification: DVD Book, Revision 0.94," Oct. 18, 2000, XP-002167964.
MPEG-4 Intellectual Property Management & Protection (IPMP) Overview & Applications Document. Dec. 1998, pp. 1-8.
Nicholson, D. et al., "Watermarking in the MPEG-4 Context," Proceedings of the Europpean Conference on Multimedia Applications, Services and Techniques, 1999, pps. 472-492, XP000910536.

* cited by examiner

*Primary Examiner*—Hosuk Song
(74) *Attorney, Agent, or Firm*—Blakely, Sokoloff, Taylor & Zafman LLP

(57) ABSTRACT

A method and apparatus to protect unencrypted content or data in a storage media from prohibited use or reproduction by encrypting unprotected content before it is transmitted to another device or software application. A compliant device or software application is capable of decrypting the content, detecting any watermark within the content, and accessing or processing the content according to the restrictions associated with the detected watermark. Non-compliant devices or software are prevented from accessing or processing the content since they are unable to decrypt it.

28 Claims, 6 Drawing Sheets

METHOD AND APPARATUS FOR CONTENT PROTECTION ACROSS A SOURCE-TO-DESTINATION INTERFACE

CROSS REFERENCE TO RELATED APPLICATIONS

This non-provisional United States (U.S.) patent application is a continuation-in-part (CIP) and claims the benefit of U.S. patent application Ser. No. 09/823,423 filed on Mar. 29, 2001 by inventors Michael S. Ripley et al., titled "METHOD AND SYSTEM FOR PROVIDING BUS ENCRYPTION BASED ON CRYPTOGRAPHIC KEY EXCHANGE", both applications are to be assigned to Intel Corporation.

FIELD

The invention relates to a system for protecting content from unauthorized reproduction. More particularly, the invention relates to a method and apparatus for protecting watermarked content during transmission from a source device to a destination device by employing bus encryption.

BACKGROUND

Increasingly, copyrightable content is being distributed in digital form on various physical media types, including Digital Versatile Disk (DVD). While digital content, such as video and music, has provided greater fidelity to the consumer, it has the significant drawback of being relatively easy to reproduce perfect copies of the content without the authorization of the copyright owner. Analog content is also susceptible to illicit reproduction and/or use. Because analog and/or digital content may be copied at any point along the path through which it is transmitted, a number of security measures are usually utilized in combination.

A variety of techniques are available for protecting analog and/or digital content stored in a storage medium from unauthorized copying such as scrambling and encryption/decryption techniques.

However, the integrity of some copy protection techniques has been compromised and such copy protection techniques are no longer technically effective against unauthorized copying of copyrighted material. For example, in digital versatile disc (DVD) technology, the integrity of content scramble system (CSS) for scrambling DVD video contents has been recently compromised by hackers. Software programs are now available that can descramble the contents of CSS-protected DVDs. Thus, unauthorized parties may be able to copy and/or play back decrypted digital content.

Additionally, content on a storage medium is usually transmitted from a source, drive, or storage device (i.e. any device capable of accessing data from a storage medium) to a destination or host device (i.e. any device capable of retrieving data from the source or storage device) over a data bus in a form that can be captured by anyone having the proper equipment. Although the data transmitted may not be in its original form (i.e. content may be encrypted and/or scrambled), a copy of the encrypted and/or scrambled data captured at the time of the transmission may still be playable by presenting the encrypted data to a host device as though it was coming from a legitimate storage device.

Another situation in which analog and/or digital content (copyright protected or otherwise) may be compromised is when it is transmitted across an interface (i.e. from a source device to a destination device, etc.) in analog form which can be easily copied and reproduced. In this instance, the content may be unencrypted and/or unscrambled making it possible to create unprotected copies of the content.

One security measure for protecting content against unauthorized use and/or copying employs watermarking as a part of the protection scheme. Watermarking is a technique by which information is embedded into content in such a way that it is transparent to users of the content, is difficult to remove from the content, and can be robustly detected in the content by specialized hardware or software.

In some systems, the watermark may indicate conditions and requirements constraining use of the content, including constraints specific to copying. In various devices, the watermark serves to control/restrict use, access, playback, and/or reproduction of the content.

A recording device that is compliant with a watermarking system may be required to detect the watermark in content that is to be copied, particularly when such content is received in unprotected or unencrypted form. If a watermark is present, the device only makes a copy if permitted by the watermark. When making an authorized copy of watermarked content, the compliant recording device may also be required to update the watermark to reflect the copy, and encrypt the copy in the case of certain types of storage media.

A player, host, or source device that is compliant with a watermark protection system may be required to detect the watermark in content that is to be played back from a storage medium, particularly when such content is stored in unprotected or unencrypted form. If a watermark is present, the player device prevents such playback in cases where the watermark's state is inconsistent with the requirements indicated by the watermark. For example, playback might be prevented in cases where watermarked content is found unencrypted on a storage medium for which it should have been encrypted. As another example, playback might be prevented for a copy of content that contains a watermark that either (1) was not properly updated to reflect the copy, or (2) indicates that the copy was not authorized.

Watermarks may be employed in conjunction with, or independent of, other content protection systems such as encryption and/or scramble content protection. For example, encryption may be required for watermarked content distributed on pre-recorded storage media. In another example, the watermarks may be employed with unprotected or unencrypted content. This may be the case where (1) the content was originally stored without encryption or (2) the content has been decrypted and copied without authorization.

Despite the added content protection provided by the use of watermarks, the location of the watermark detector may result in compromising the content being protected. Depending on how the watermark is detected and processed, the content may be susceptible to unauthorized copying.

DETAILED DESCRIPTION

In the following detailed description of the invention, numerous specific details are set forth in order to provide a thorough understanding of the invention. However, one skilled in the art would recognize that the invention may be practiced without these specific details. In other instances well known methods, procedures, components, and circuits have not been described in detail so as not to unnecessarily obscure aspects of the invention.

In the following description, certain terminology is used to describe various features of the invention. For example, the terms 'content' and 'data' may be used interchangeably to refer to any compilation of bits or information. The invention is equally applicable where said content is in digital and/or analog form. The terms 'source' or 'drive' device may be used interchangeably to refer to a device which hosts a storage medium containing content. The terms 'destination' or 'host' device may be used interchangeably to refer to a device which receives the content and processes it, plays it, and/or records it. It must be understood that wherever the terms 'access', 'playback', or 'record' are used, the other terms are equally applicable. Additionally, while the term 'unencrypted' content appears in several figures, this is done for purposes of illustration as the invention applies to 'unprotected' content in general. Unprotected content includes, but is not limited to, content which due to inadequate protection can be accessed, played, and/or copied by unauthorized means.

One aspect of the invention provides a method, apparatus, and system to ensure that unprotected watermarked content is protected from unauthorized access and/or reproduction by employing bus encryption. This aspect of the invention addresses the various watermark detection configurations which may make analog and/or digital content susceptible to copying. In various configurations the watermark detector may be implemented as hardware and/or software running on a device.

Figure 1:
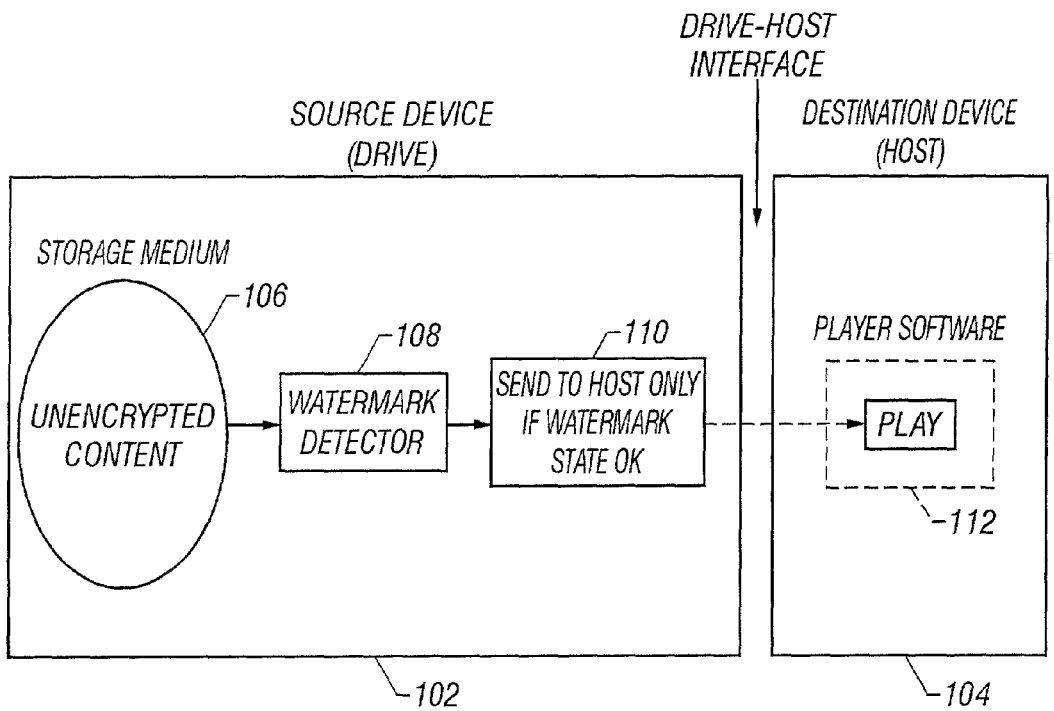
FIG. 1 is a block diagram illustrating a first configuration for protecting content at a source device from prohibited access at a destination device.

Referring to FIG. 1, a watermark detector 108 is located in the source or drive device 102. The source device 102 checks for a watermark in the unprotected/unencrypted content that is read from the storage medium 106. If a watermark is detected within content and the content is being processed in a way that is inconsistent with the requirements indicated by the watermark, then the source device 102 can prevent playback and/or access by refusing to pass that content to the destination or host device 104.

According to one implementation, the source device 102 is a DVD drive and the destination or host device 104 is a computer, processing unit, playback device, or recording device.

Watermark detection at the source device 102 has a number of disadvantages. First, watermark detection is usually a resource-intensive operation, and may therefore place a significant burden on the source device 102 in terms of cost and performance, parameters to which such devices are particularly sensitive. Second, watermark detection in a source device 102 might be trivially circumvented, such as by performing a transformation (e.g. bit-wise inversion) on the content before it is stored, and then performing the inverse operation in the destination device 104 after the content is received from the source device 102.

Figure 2:
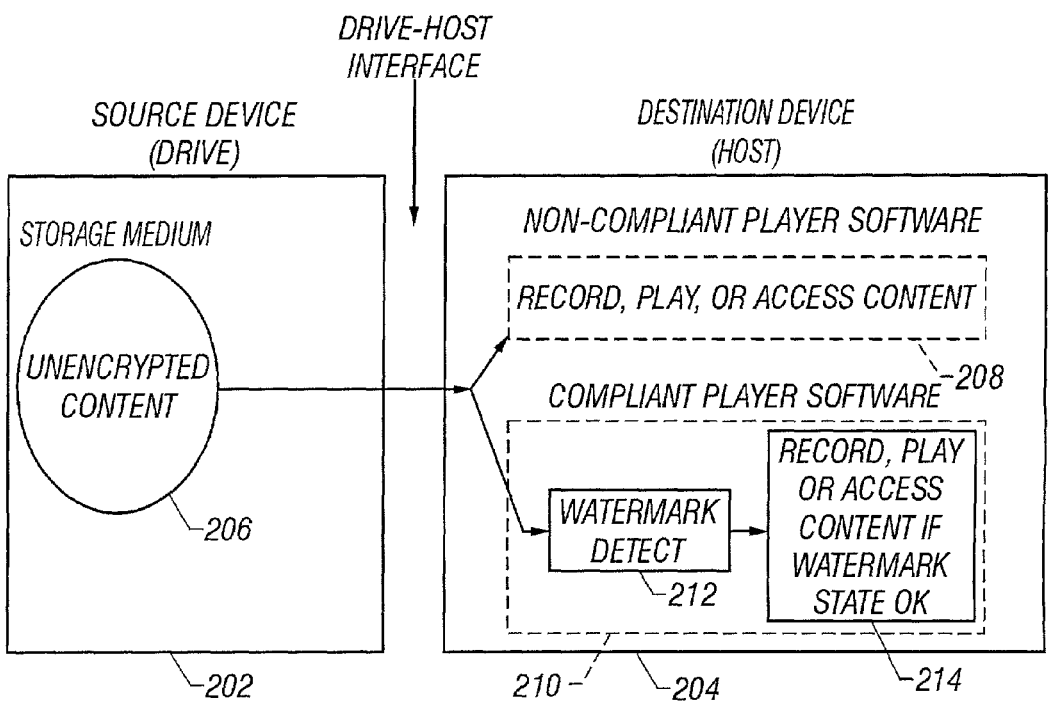
FIG. 2 is a block diagram illustrating a second configuration for protecting content from prohibited access at a destination device.

Referring to FIG. 2, the watermark detector 212 may be implemented on the destination device 204. Such a configuration could alleviate the cost/performance problems related to implementing the detector in a source or drive device 102. A compliant software application 210 may detect the watermark 212, determine if it is valid, and, if so, access, record, playback, and/or process the content according to the restrictions associated with the watermark 214.

However, this approach also introduces other challenges. For example, once content has entered the destination device 204, it may be accessible by a number of software applications. The watermark-based access control, process control, and/or record or playback control provided by one compliant application might be circumvented by simply routing the content to another non-compliant application 208 that plays the content without regard to watermarks. Therefore, in the case where watermark detection is implemented by software running on the destination device 204, some means are needed to ensure that the content is only played after watermark detection and access, record, or playback control are performed by that software.

One aspect of the invention addresses the implementation of such watermark-based controls so that the security of the content is not jeopardized.

According to one aspect of the invention, a bus encryption scheme is deployed to enhance copy or access protection of certain types of originally unprotected content. Unprotected content includes, but is not limited to, content which due to inadequate protection can be accessed, played, and/or copied by unauthorized means. For example, content which is stored in a storage medium in unencrypted form would be considered unprotected content since it can be accessed, played, and/or copied by unauthorized devices. This is so even if the content contains a watermark since an unauthorized device may access the content by ignoring the watermark.

In one implementation, bus encryption is applied to unencrypted content—content which was stored in unencrypted form on a storage medium—to protect the content during transmission from a source device (i.e. drive) to a destination device (i.e. host). This is useful where watermarking is used for playback control—ensuring that watermarked content recorded on a storage medium in unprotected form is not illicitly played back—while allowing playback control to be performed by a destination device. This may be accomplished by requiring the destination device to comply with watermark controls as a condition of receiving a decryption key to decrypt transmitted content.

However, the invention is not limited to protecting unprotected/unencrypted content, and in other embodiments of the invention, encryption is applied to content which was already stored in encrypted form in the storage medium.

Thus, the invention may provide a second level of encryption or doubly encrypt such content.

Figure 3:
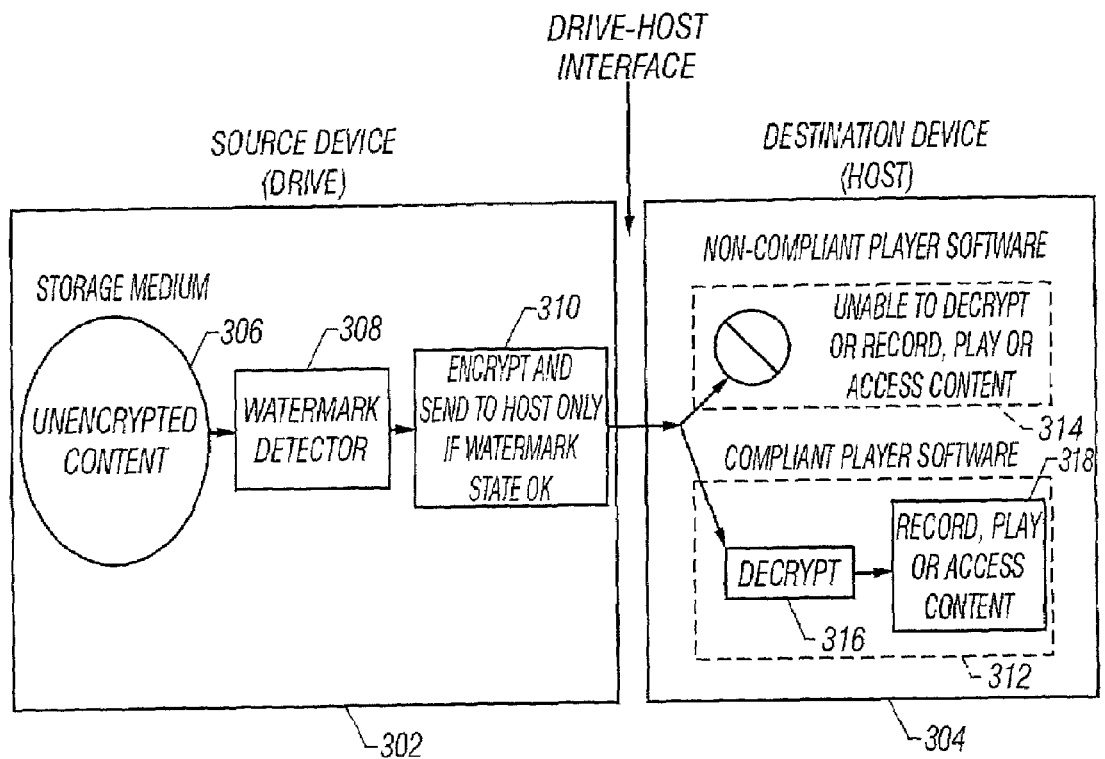
FIG. 3 is a block diagram illustrating a first configuration for protecting content as it is transmitted from a source device to a destination device by encrypting the content at the source device.

FIG. 3 illustrates a bus encryption scheme where, in a source device 302, unprotected content is read from a storage medium 306 and sent to a watermark detector 308. The watermark detector determines if the content may be accessed based on the watermark. The watermark may also limit the purpose(s) for which the content may be accessed.

If access to the content, and/or the purpose for which the content is accessed, is consistent with the indications of the watermark, the source device encrypts the content 310 before transferring it to the destination device 304. A destination device software or component that is capable of calculating the proper decryption key, also known as a compliant software or component 312, can then decrypt 316 and access, process, playback, and/or record the content received 318. A software or component without such capability 314, also known as non-compliant software or component, will be unable to decrypt or access that content.

Figure 4:
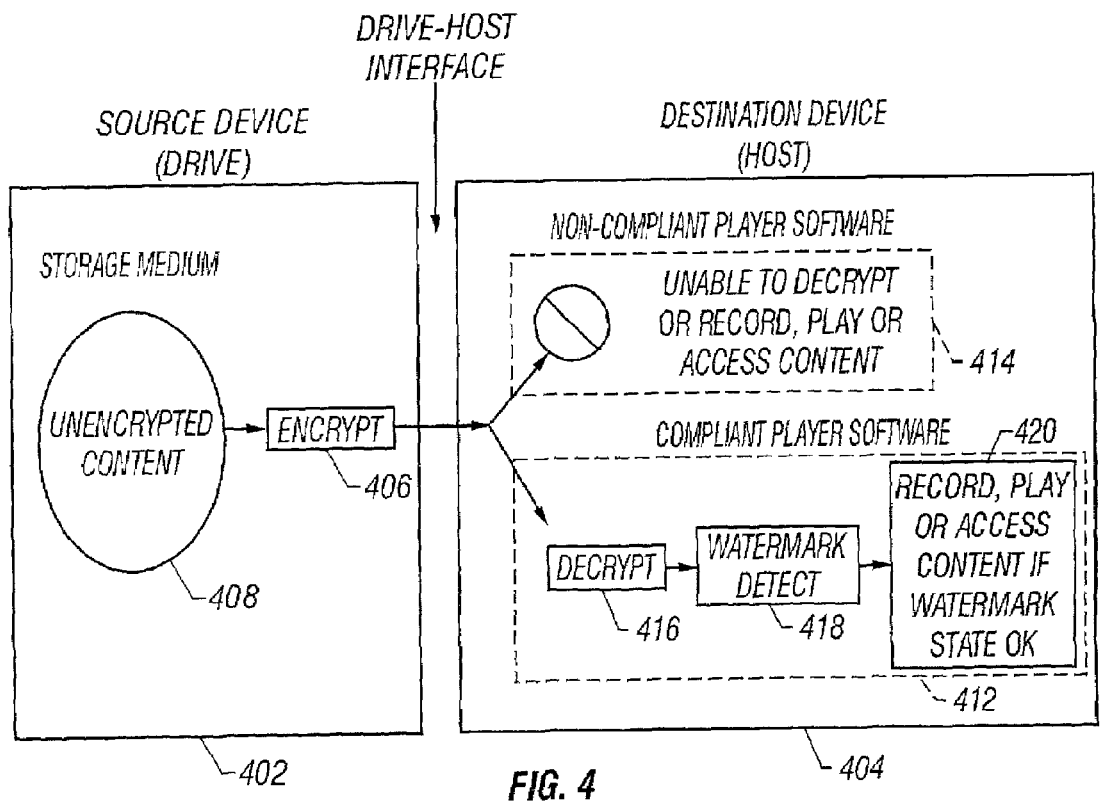
FIG. 4 is a block diagram illustrating a second configuration for protecting content as it is transmitted from a source device to a destination device by encrypting the content at the source device.

FIG. 4 depicts another embodiment of the invention. The source device 402 reads the unprotected/unencrypted content from the storage medium 408 and encrypts it 406 before transferring it to the destination device 404. This embodiment has the advantage of moving all watermark detection onto the destination device 404 and away from the source device 402. Access to the intellectual property required to form the corresponding decryption key is preconditioned on compliance with rules regarding watermark-based access, record, and/or playback control.

A compliant application 412 receiving the bus-encrypted content will decrypt the content 416, perform the required watermark detection and controls 418 before playing, processing, or otherwise providing access 420 to that content.

A non-compliant application 414 receiving the bus-encrypted content will be unable to access the content due to its inability to form the proper decryption key.

According to one embodiment, the destination (host) device 404 includes a decryption subsystem to decrypt the data or content supplied from the source (i.e. drive or storage) device 402. A key distribution data block, such as a media key block (MKB), may be part of the data or content on the storage media. The MKB serves to determine whether the source device 402 and/or destination device 404 are legitimate. In one implementation, part or all of the MKB is transmitted from the storage media to the destination device 404. The MKB may be encrypted by the source device 402 before it is transmitted to the destination device 404.

Algorithms at the source device 402 and/or destination device 404 utilize the MKB and unique device keys to compute a media key. The media key may serve to encrypt content at the source device 402 before transmission to the destination device 404. The destination device 404 may then decrypt the received content using its computed media key.

According to one implementation of the encryption/decryption scheme for this content copy protection system, a random number generator on the destination device 404 generates a random or sequential number (referred hereinafter as "nonce") and sends a copy of it to the source device 402. The source device combines the nonce received from the destination device 404 with a previously calculated media key using a one-way function and returns the result (i.e., a bus key) to an encryption logic component in the source device 402. The one-way function is configured such that the bus key can be generated by inputting the media key and the nonce, however, determining the media key from the bus key and nonce is computationally infeasible. The destination device 404 also employs the one-way function to combine the previously calculated media key and the nonce to produce its own bus key to be used by a decryption logic component in the destination device 404. It should be noted that since the same one-way function is used by the source device 402 and destination device 404, both source and destination devices 402 and 404 will generate the same bus key provided that same media key and nonce was used by both devices to generate the bus key. In this manner, content from the storage media may be protected during transmission. After receiving and decrypting the content, the destination device 404 may then try to detect a watermark and access and/or process the content according to the restrictions corresponding to the watermark.

In one embodiment of the invention, the source device, i.e. 402, might blindly apply bus encryption to all data that it reads from the storage medium, i.e. 408. However, such an approach might interfere with uses of ordinary computer files, or cause other such inconveniences. For example, unencrypted files and/or content on the storage media which is not intended to be protected could not be accessed by a processing application on the destination device. That is, the processing application would not be able to decrypt the encrypted content since it had expected unencrypted content.

Figure 5:
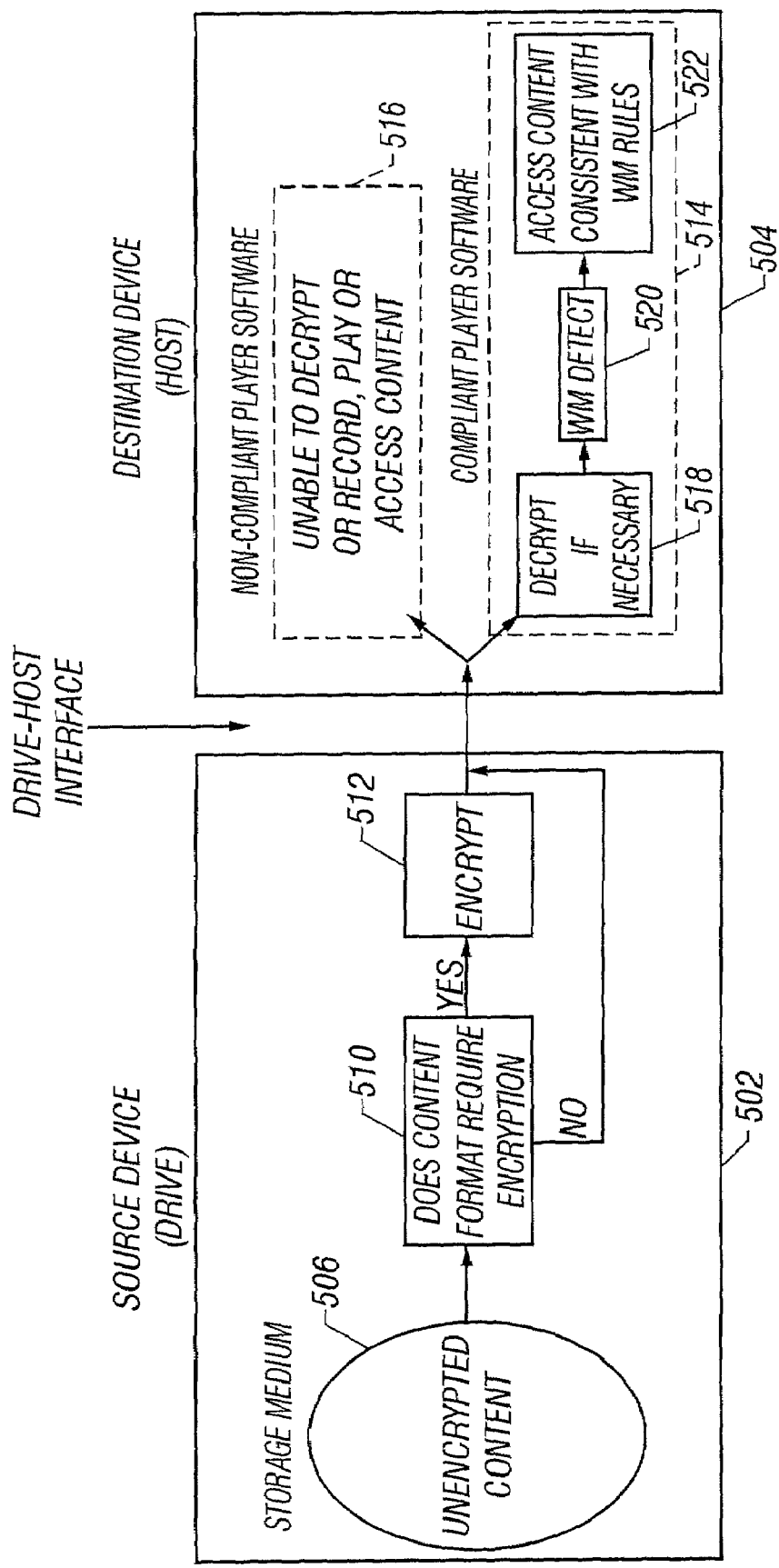
FIG. 5 is a block diagram illustrating a third configuration for protecting content as it is transmitted from a source device to a destination device by encrypting the content at the source device if the content is of the type that requires encryption.

Therefore, in another embodiment of the invention, illustrated in FIG. 5, the source device 502 first determines if the data is subject to watermarking 510 before bus-encrypting it 512. Such a determination might be made based on the format of the content, such as by determining whether it is a particular video format (e.g. DVD Video), etc.

One liability of such format-based approach to encryption is that it might be defeated by performing some transformation (such as bit-wise inversion) on the content before it is stored, and then performing the inverse operation in the destination device 504 after the content is received from the source device 502. Note, however, that this is no worse than the similar problem that exists when watermark detection is located in the source device, as mentioned above.

If the content in the storage medium 506 is subject to watermark protection, then it is encrypted 512 before being sent to the destination device 504.

In the destination device 512, compliant software or module 514 then decrypts the content 518, if it is encrypted, detects the watermark 520, and processes/accesses the content according to the watermark rules 522.

Non-compliant applications 516, software and/or hardware, which do not follow the established rules for content protection are unable to decrypt and/or access the encrypted content.

Figure 6:
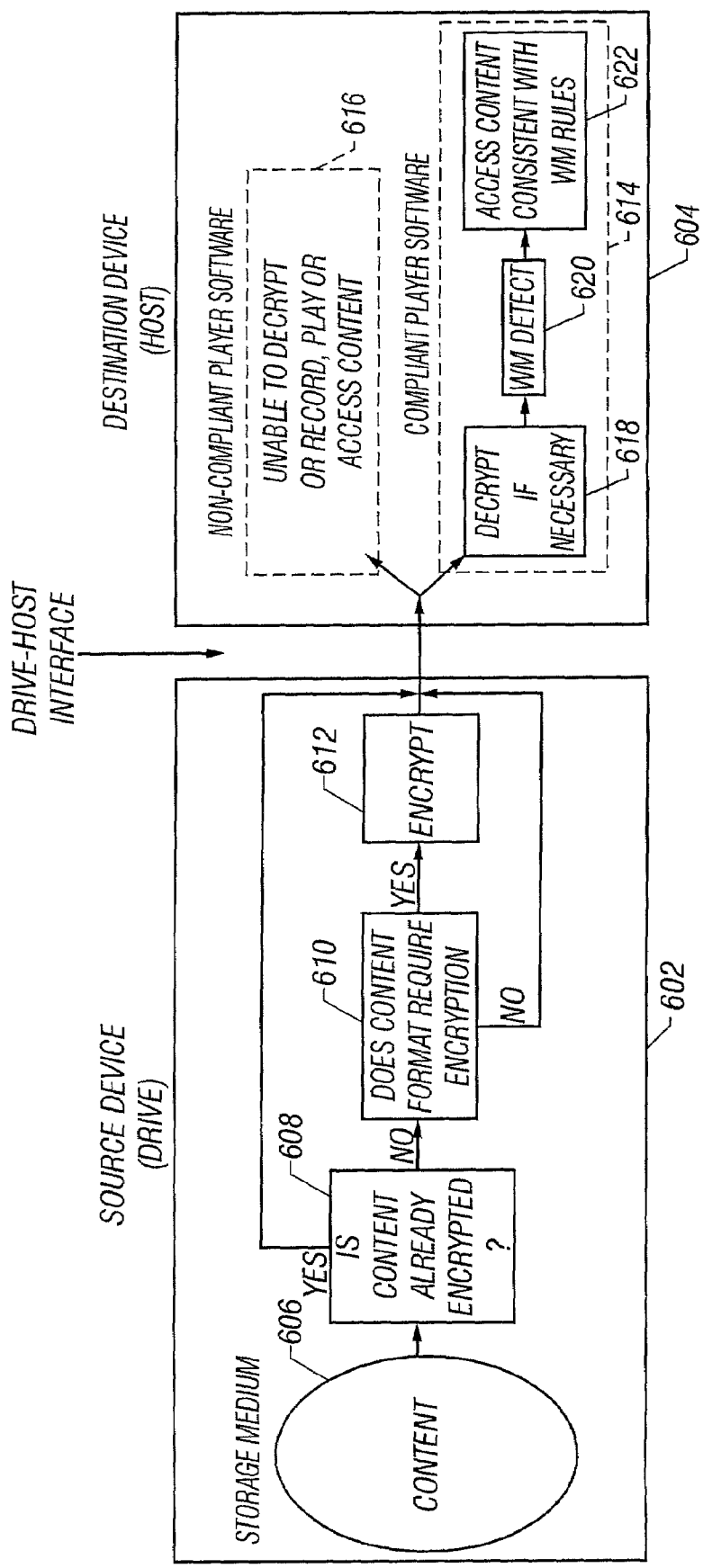
FIG. 6 is a block diagram illustrating a fourth configuration for protecting content as it is transmitted from a source device to a destination device by encrypting the content at the source device if the content is not already encrypted and if said content is of the type that requires encryption.

FIG. 6 illustrates yet another embodiment of the invention where source drive 602 first determines whether the content in the storage medium 606 is already encrypted 608. If the content is already encrypted there is no need to encrypt it again and the content is sent directly to the destination device 604. If the content is not protected or encrypted then a determination is made as to whether it should be encrypted 610, and, if so, it is encrypted 612 before being sent to the destination device 604.

The destination device 604 then processes the content received as illustrated and described in FIG. 5.

In some embodiments, the bus decryption, i.e. 518, and watermark detection, i.e. 520, may be performed by a playback application. In still other implementations, bus decryption might be performed by a driver that provides access on behalf of one or more playback applications.

According to one embodiment, if the watermark is inconsistent with the content form or intended use then compliant applications or components will prevent accessing, processing, or playback of said content. For example, if a watermark indicates that the content should be encrypted but it is read in unencrypted form, then the source device (drive device) can refuse to transmit the content.

The concepts described herein may be applied to recording control as well. In such a case, the bus encryption may be performed by the source device as a means of ensuring watermark-based recording control in the destination device. For instance, the recording device may prevent recording of content which its watermark indicates should not be copied. Also, the recording device may prevent reproduction of content in unencrypted form which its watermark indicates should be encrypted, and vice versa. Additionally, the recording device may add a marker or modify the watermark in the content to indicate that the content being reproduced has been previously reproduced.

Figure 7:
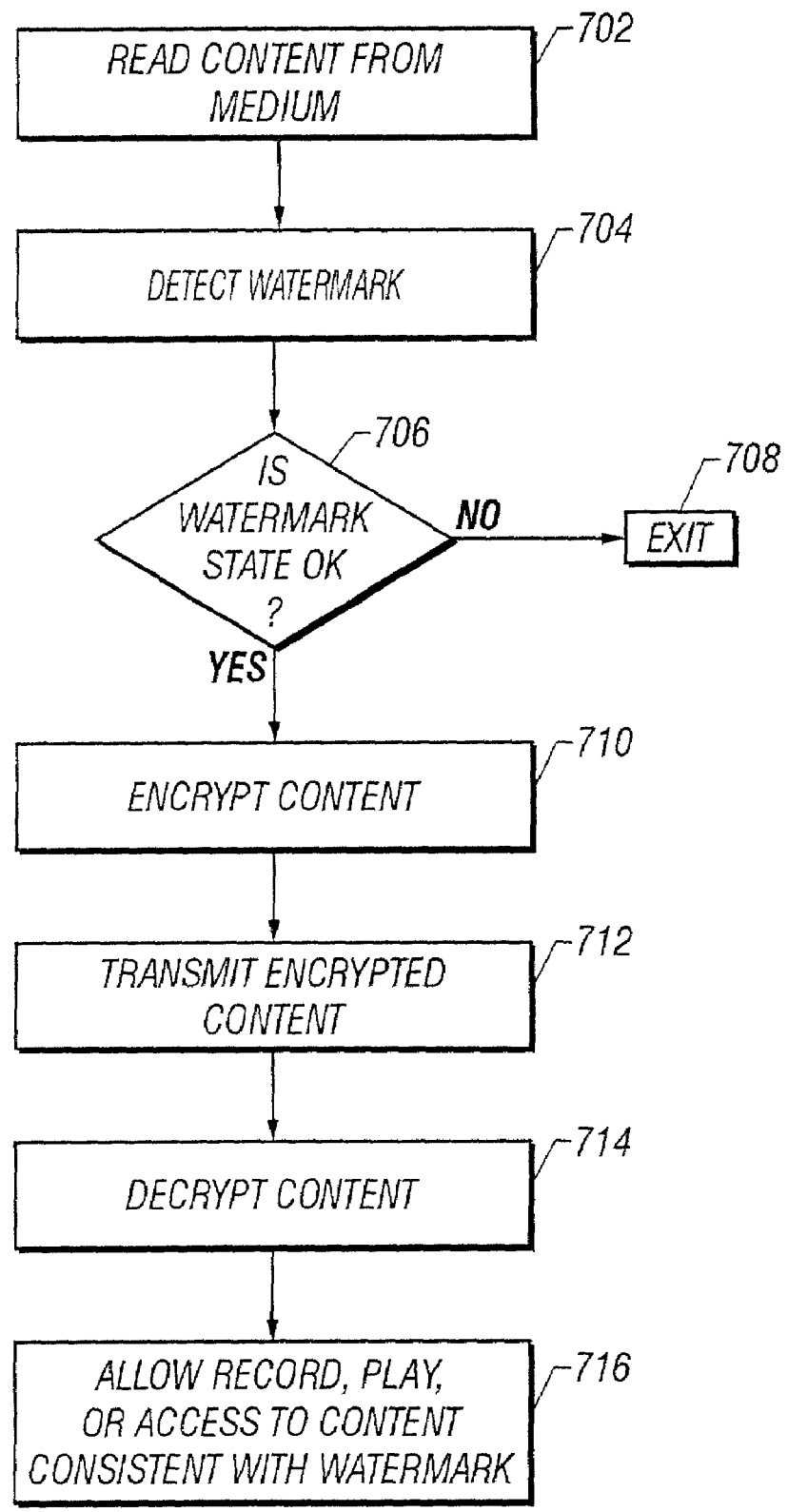
FIG. 7 is a flow diagram illustrating a first method of practicing the invention.

FIG. 7 illustrates a first method for practicing the invention where watermark detection is performed at the source device. Content, including unprotected content, is read from the storage medium 702 and its watermark, if any, is detected 704.

If the watermark is consistent with the stored content and the intended use 706, then the content is encrypted 710 and then transmitted to another system or device 712.

If the watermark is invalid or inconsistent with the stored content or intended use, then the process ends 708 and does not permit the content to be transferred or accessed.

The receiving system or device then decrypts the content 714 thereby allowing the content to be recorded, played, or otherwise accessed in a manner consistent with the watermark restrictions 716.

Figure 8:
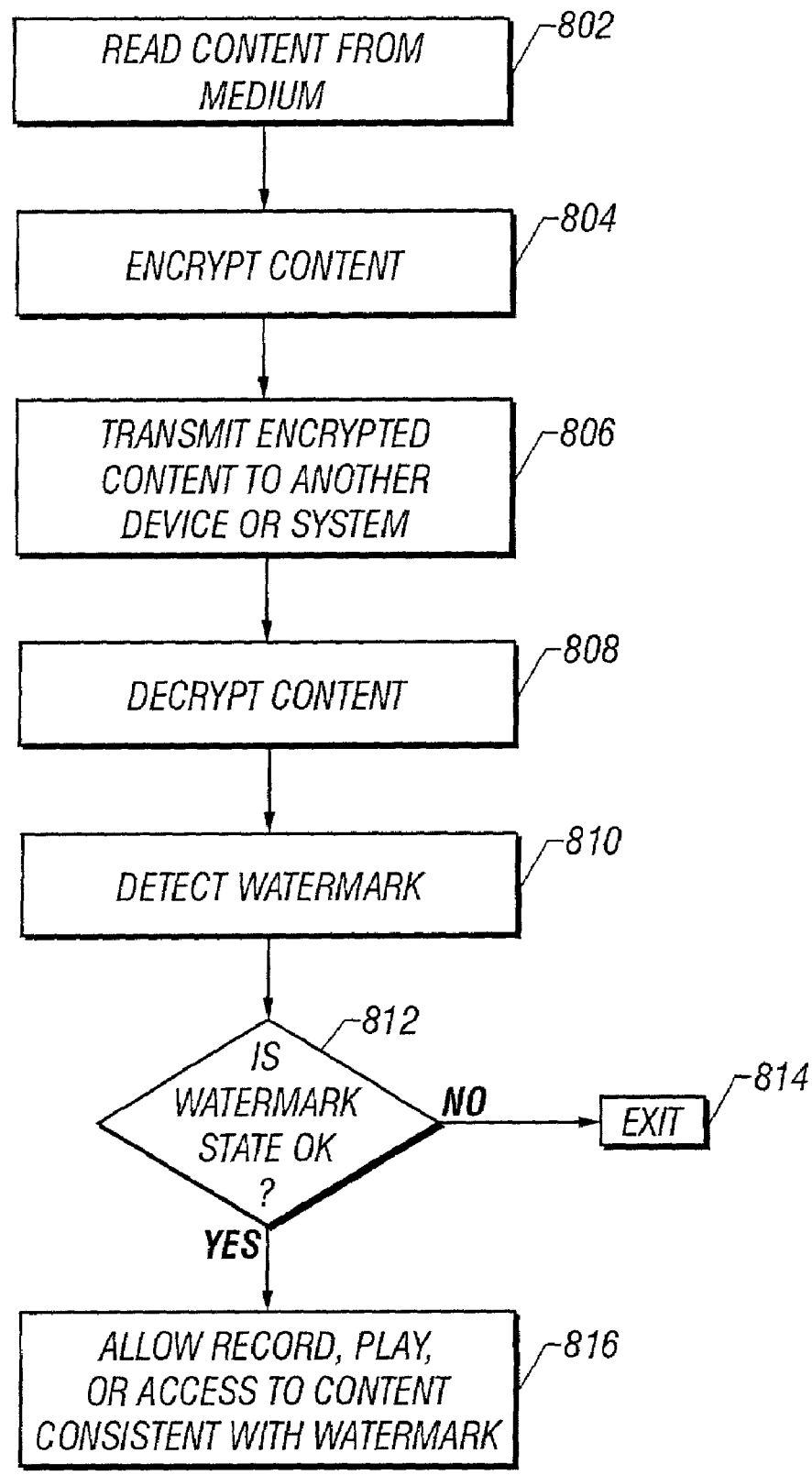
FIG. 8 is a flow diagram illustrating a second method of practicing the invention.

FIG. 8 illustrates a second method for practicing the invention where watermark detection is performed at the receiving (destination) device. Content, including unprotected content, is read from the storage medium 802, the content is encrypted 804 and then transmitted to another system or device 806. In alternative processes, the content may be encrypted only if it is not already encrypted or if it is a type of content which requires encryption.

The receiving system or device then decrypts the content 808, and detects watermarks, if any, within the content 810. If the watermark is consistent with the stored content and the intended use 812, the system allows the content to be recorded, played, or otherwise accessed consistent with the watermark restrictions 816.

If the watermark is invalid or inconsistent with the stored content or intended use, then the process ends 814 and does not permit the content to be transferred or accessed.

The watermark may be formed by adding bits to the content, modifying bits within the content, removing bits from the content, and/or any other means known to those of ordinary skill in the art, such that an identifiable symbol, pattern, marker, or label is created. It must be clearly understood that the invention is not limited to any particular form of watermarking technology.

The encryption and decryption stages may be performed according to any desired algorithm sufficiently robust to prevent the encrypted content from being easily accessed by non-compliant or unauthorized devices and/or applications.

The watermark detector, encryption stage, and decryption stage may be implemented using one or more microprocessors, integrated circuits, software applications or modules, programmable devices, and/or other means.

The various components and aspects of the invention described herein may be practiced in one or more devices or modules, as one or more methods or processes, and may be embodied in machine-readable medium or a carrier wave. For example, while the invention is illustrated using a source or drive device and a destination or host device, the invention may be practiced within a single device, multiple devices, and/or a combination of hardware and software components. Additionally, the term 'source device' is not limited to a device hosting storage medium or a device where content originates. A source device includes any device from which content originates and/or a device which relays content to other devices.

While certain exemplary embodiments have been described and shown in the accompanying drawings, it is to be understood that such embodiments are merely illustrative of and not restrictive on the broad invention, and that this invention not be limited to the configurations and arrangements shown and described, since various other modifications may occur to those ordinarily skilled in the art. For example, while some of the exemplary embodiments illustrated in the figures shows the invention operating on content which was originally unencrypted, the invention can also be practiced on content which is stored in encrypted form in a storage medium.

Additionally, it is possible to implement the present invention or some of its features in hardware, firmware, software or a combination thereof where the software is provided in a processor-readable or machine-readable storage medium such as a magnetic, optical, or semiconductor storage medium.

The processor-readable or machine-readable medium may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc.

The some or all aspects of the invention may also be embodied within a carrier signal. The carrier signal may include any signal that can propagate over a transmission medium such as electronic network channels, optical fibers, air, electromagnetic, RF links, etc.

While the invention has been described in particular embodiments, the invention should not be construed as limited by such embodiments.

What is claimed is:

1. A method comprising:
   reading unencrypted content and a key distribution data block at a source device;
   detecting if the unencrypted content is subject to watermarking;
   employing the key distribution data block to generate a bus key at the source device;
   encrypting the unencrypted content using the bus key at the source device before transmission to a destination device to create encrypted content if the unencrypted content is subject to watermarking; and
   transmitting the encrypted content to the destination device.

2. The method of claim 1 further comprising:
   detecting if the content received is encrypted; and
   decrypting the content only if it is encrypted.

3. The method of claim 1 wherein the destination device is provided with the capability of generating a bus key capable of decrypting the received content only if the destination device complies with content protection controls.

4. The method of claim 1 further comprising:
   reading content from a storage media.

5. The method of claim 4 wherein detecting if the unencrypted content is subject to watermarking is determining whether the storage media is a Digital Versatile Disk (DVD)-compliant media.

6. The method of claim 4 further comprising:
checking if the content in the storage media is encrypted.

7. The method of claim 1 wherein detecting if the unencrypted content is subject to watermarking is based on a format of the unencrypted content.

8. A device comprising:
a media reader to read unencrypted content and a key distribution data block from a storage media;
a watermark detector, coupled to the media reader, to detect if the unencrypted content is subject to watermarking;
an encryption module, coupled to the media reader and the watermark detector, to encrypt the unencrypted content based on the key distribution data block before transmission to a destination device to create encrypted content if the unencrypted content is subject to watermarking; and
a communication interface, coupled to the encryption module, to transmit the encrypted content to the destination device.

9. The device of claim 8 wherein the watermark detector is further to detect if the unencrypted content is subject to watermarking by determining whether the storage media is Digital Versatile Disk (DVD)) compliant media.

10. The device of claim 8 wherein the watermark detector is further to detect if the unencrypted content is subject to watermarking by determining a format of the unencrypted content.

11. A system comprising:
a first device including,
a media reader to read unencrypted content and a key distribution data block from a storage media,
a watermark detector, coupled to the media reader, to detect if the unencrypted content is subject to watermarking,
an encryption module, coupled to the media reader and the watermark detector, to generate a bus key which is used to encrypt the unencrypted content before transmission to a destination device if the unencrypted content is subject to watermarking, and
a transmitter, coupled to the encryption module, to transmit the encrypted content; and
a second device, communicatively coupled to the first device, including,
a receiver to receive the encrypted content,
a decryption component, coupled to the receiver to decrypt the content, and
a watermark component, coupled to the decryption component, to access the content according to watermark rules.

12. The system of claim 11 wherein the decryption component is only capable of decrypting the received content if the second device complies with content protection controls.

13. The device of claim 11 wherein the watermark detector is further to detect if the unencrypted content is subject to watermarking by determining a format of the unencrypted content.

14. The device of claim 11 wherein the watermark detector is further to detect if the unencrypted content is subject to watermarking by determining whether the storage media is Digital Versatile Disk (DVD) compliant media.

15. A machine-readable medium comprising at least one instruction to protect unprotected content from unauthorized use, which when executed by a processor, causes the processor to perform operations comprising:
reading unencrypted content including a key distribution data block from a storage media on a first module;
detecting if the unencrypted content is subject to watermarking;
generating a bus key from the key distribution data block;
employing the bus key to encrypt the unencrypted content at the first module before transmission to a second module to create encrypted content if the unencrypted content is subject to watermarking; and
sending the encrypted content from the first module over an interface to the second module.

16. The machine-readable medium of claim 15 wherein detecting if the unencrypted content is subject to watermarking is determining whether the storage media is a Digital Versatile Disk (DVD)-compliant media.

17. The machine-readable medium of claim 15 wherein detecting if the unencrypted content is subject to watermarking is based on a format of the unencrypted content.

18. A method comprising:
reading unencrypted content and a key distribution data block at a source device;
detecting if the unencrypted content is subject to watermarking;
encrypting the unencrypted content at the source device before transmission to a destination device to create encrypted content if the unencrypted content is subject to watermarking;
transmitting the encrypted content to the destination device; and
transmitting the key distribution data block to the destination device to generate a bus key to decrypt the received content.

19. The method of claim 18 further comprising:
detecting if the content received is encrypted; and
decrypting the content only if it is encrypted.

20. The method of claim 18 wherein the destination device is provided with the capability of generating a bus key capable of decrypting the received content only if the destination device complies with content protection controls.

21. The method of claim 18 further comprising:
reading content from a storage media.

22. The method of claim 21 wherein detecting if the unencrypted content is subject to watermarking is determining whether the storage media is a Digital Versatile Disk (DVD)-compliant media.

23. The method of claim 21 further comprising:
checking if the content in the storage media is encrypted.

24. The method of claim 18 wherein detecting if the unencrypted content is subject to watermarking is based on a format of the unencrypted content.

25. A system comprising:
a first device including,
a media reader to read unencrypted content and a key distribution data block from a storage media,
a watermark detector, coupled to the media reader, to detect if the unencrypted content is subject to watermarking,
an encryption module, coupled to the media reader and the watermark detector, to encrypt the unencrypted content before transmission to a destination device if the unencrypted content is subject to watermarking, and a transmitter, coupled to the encryption module, to transmit the encrypted content and the key distribution data block; and a second device, communicatively coupled to the first device, including, a receiver to receive the encrypted content and the key distribution data block, a decryption component, coupled to the receiver to generate a bus key from the key distribution data block and to decrypt the content using the bus key, and a watermark component, coupled to the decryption component, to access the content according to watermark rules.

26. The system of claim 25 wherein the decryption component is only capable of decrypting the received content if the second device complies with content protection controls.

27. The device of claim 25 wherein the watermark detector is further to detect if the unencrypted content is subject to watermarking by determining a format of the unencrypted content.

28. The device of claim 25 wherein the watermark detector is further to detect if the unencrypted content is subject to watermarking by determining whether the storage media is Digital Versatile Disk (DVD) compliant media.

* * * * *